United States Patent
Fox et al.

(10) Patent No.: US 6,559,202 B1
(45) Date of Patent: May 6, 2003

(54) ANTIFOULING PAINT

(75) Inventors: John Fox, Wallsend (GB); Alistair Andrew Finnie, Whitley Bay (GB)

(73) Assignee: Akzo Nobel N.V., Arnhem (NL)

(*) Notice: Subject to any disclaimer, the term of this patent is extended or adjusted under 35 U.S.C. 154(b) by 0 days.

(21) Appl. No.: 09/889,804

(22) PCT Filed: Jan. 18, 2000

(86) PCT No.: PCT/EP00/00398

§ 371 (c)(1),
(2), (4) Date: Sep. 24, 2001

(87) PCT Pub. No.: WO00/43460

PCT Pub. Date: Jul. 27, 2000

(30) Foreign Application Priority Data

Jan. 20, 1999 (EP) .......................................... 99300378

(51) Int. Cl.$^7$ .................................................. C09D 5/14
(52) U.S. Cl. ......................................... 523/122; 106/16
(58) Field of Search ............................. 106/16; 523/122

(56) References Cited

U.S. PATENT DOCUMENTS

| | | | | |
|---|---|---|---|---|
| 4,221,839 A | | 9/1980 | De Graaf | 428/413 |
| 4,675,051 A | | 6/1987 | Baxter | 106/16 |
| 5,116,407 A | * | 5/1992 | Hunter et al. | 106/16 |

FOREIGN PATENT DOCUMENTS

| | | | | |
|---|---|---|---|---|
| EP | 069 559 | 1/1983 | ............ | C09D/5/16 |
| EP | 204 456 | 12/1986 | ........... | C08F/30/04 |
| EP | 342 276 | 11/1989 | ............. | C08F/8/44 |
| EP | 343 897 | 11/1989 | ............. | C09D/5/14 |
| EP | 449 817 | 10/1991 | ......... | H01R/13/523 |
| EP | 526 441 | 2/1993 | ............. | C09D/5/14 |
| EP | 529 693 | 3/1993 | ............ | C09D/5/14 |
| EP | 617 096 | 9/1994 | ............ | C09D/5/14 |
| EP | 779 304 | 6/1997 | ............. | C08F/8/44 |
| EP | 802 243 | 10/1997 | ............ | C09D/5/16 |
| FR | 2 385 779 | 10/1978 | ............ | C09D/5/14 |
| GB | 1 457 590 | 12/1976 | ............ | C09D/5/16 |
| GB | 2 204 046 | 11/1988 | ........... | C08L/33/00 |
| GB | 2 311 070 | 9/1997 | ............. | C08F/8/42 |
| JP | 11-116858 | 4/1999 | ............ | C09D/5/16 |
| WO | WO 91/09915 | 7/1991 | ............ | C09D/5/14 |
| WO | WO 91/14743 | 10/1991 | ............ | C09D/5/14 |
| WO | WO 99/37723 | 7/1999 | ............ | C09D/5/16 |

OTHER PUBLICATIONS

Abstract of JP 11116858 from EPO on-line data base esp@cenet.
Abstract of JP 63286471 from EPO on-line data base esp@cenet.

* cited by examiner

Primary Examiner—Kriellion A. Sanders
(74) Attorney, Agent, or Firm—Lainie E. Parker; David H. Vickrey

(57) ABSTRACT

The invention relates to an antifouling paint having a binder comprising a rosin material and an auxiliary film-forming resin, the paint including an ingredient having marine biocide properties, wherein the binder comprises a blend of the rosin material and an auxiliary film-forming resin in a ratio of 20:80 to 95:5 by weight, the auxiliary film-forming resin comprising 20–100% by weight of an acid-functional film-forming polymer (A) whose acid groups are blocked by groups capable of hydrolyzing or dissociating to leave a polymer soluble in sea water, the blocking groups being selected from divalent metal atoms bonded to a monovalent organic residue, divalent metal atoms bonded to a hydroxyl residue and monoamine groups which form an organic solvent soluble amine salt of the polymer, and 80–0% by weight of a non-hydrolyzing water-insoluble film-forming polymer (B).

24 Claims, No Drawings

ANTIFOULING PAINT

This application is the national phase of International Patent Application No. PCT/EP00/00398, filed on Jan. 18, 2000, and which claims priority of European Patent Application No. 99300378.9, filed Jan. 20, 1999.

This invention relates to antifouling paint. An antifouling paint is used as a top coat on ships' hulls to inhibit the settlement and growth of marine organisms such as barnacles and algae, generally by release of a biocide for the marine organisms.

BACKGROUND OF THE INVENTION

Traditionally, antifouling paints have comprised a relatively inert binder with a biocidal pigment which is leached from the paint. Among the binders which have been used are vinyl resins and rosin. The vinyl resins are seawater-insoluble and paints based on them use a high pigment concentration so that there is contact between pigment particles to ensure leaching. Rosin is a hard brittle resin which is very slightly soluble in seawater. Rosin-based antifouling paints have been referred to as soluble matrix or eroding paints. The biocidal pigment is very gradually leached out of the matrix of rosin binder in use, leaving a skeletal matrix of rosin which becomes washed off the hull surface to allow leaching of the biocidal pigment from deep within the paint film.

Many successful antifouling paints in recent years have been "self-polishing copolymer" paints based on a polymeric binder to which biocidal tri-organotin moieties are chemically bound and from which the biocidal moieties are gradually hydrolyzed by seawater, as described for example in GB-A-1457590. Self-polishing copolymer paints which release non-biocidal moieties are described in EP-A-69559, EP-A-204456, EP-A-529693, EP-A-779304, WO-A-91/14743, WO-A-91/09915, GB-A-231070 and JP-A-9-286933.

U.S. Pat. No. 4,675,051 describes a marine antifouling paint which is gradually dissolved in seawater and which comprises a binder which is a resin produced by the reaction of rosin and an aliphatic polyamine containing at least one primary or secondary amine group. EP-A-802243 describes a coating composition comprising a rosin compound, a polymer containing organisilyl ester groups and an antifoulant.

Rosin is not a very good film-former, and it is known to add other film-forming resins to rosin based antifouling paints. This has sometimes led to paints which were difficult to wash off the hull surface. The present invention seeks to improve rosin-based antifouling paints with respect to the strength of the paint film and/or the reliable eroding away of the rosin-based paint matrix after biocide has been leached from the paint.

SUMMARY OF THE INVENTION

An antifouling paint according to the present invention has a binder comprising a rosin material and an auxiliary film-forming resin, the paint including an ingredient having marine biocide properties, characterized in that the binder comprises a blend of the rosin material and an auxiliary film-forming resin in a ratio of 20:80 to 95:5 by weight, the auxiliary film-forming resin comprising 20–100% by weight of an acid-functional film-forming polymer (A) whose acid groups are blocked by groups capable of hydrolyzing or dissociating to leave a polymer soluble in sea water, the blocking groups being selected from divalent metal atoms bonded to a monovalent organic residue, divalent metal atoms bonded to a hydroxyl residue and monoamine groups which form an organic solvent soluble amine salt of the polymer, and 80–0% by weight of a non-hydrolyzing water-insoluble film-forming polymer (B).

DETAILED DESCRIPTION OF THE INVENTION

The rosin material is preferably rosin, particularly wood rosin or alternatively tall rosin or gum rosin. The main chemical constituent of rosin is abietic acid. The rosin can be any of the grades sold commercially, preferably that sold as WW (water white) rosin. The rosin material can alternatively be a rosin derivative, for example a maleinised or fumarised rosin, hydrogenated rosin, formylated rosin or polymerised rosin, or a rosin metal salt such as calcium, magnesium, copper or zinc rosinate.

The film-forming polymer (A) capable of hydrolyzing or dissociating to a polymer soluble in sea water is most preferably a hydrolysable polymer having at least one side chain bearing at least one terminal group of the formula:

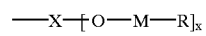

wherein X represents

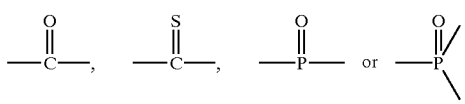

M is a metal selected from zinc, copper and tellurium; x is an integer of 1 to 2; R represents an organic residue selected from

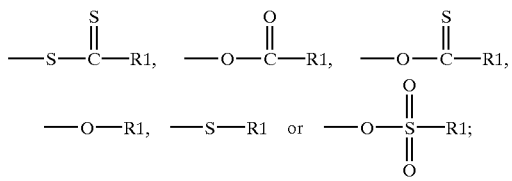

and R1 is a monovalent organic residue, as described in EP-A-204456.

Such a hydrolysable polymer is preferably an acrylic polymer in which X represents

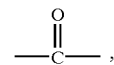

M is copper and R represents

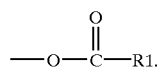

The parent acrylic polymer having a —COOH group in place of —X—[O—M—R]$_x$ preferably has an acid value of 25–350 mg KOH/g. Most preferably the hydrolysable polymer has a copper content of 0.3–20% by weight and R$^1$ is the residue of a high boiling organic monobasic acid. Such hydrolysable polymers can be prepared by the processes of EP-A-204456 and EP-A-342276. The copper-containing film-forming polymer (A) is preferably a copolymer comprising an acrylic or methacrylic ester whose alcohol residue includes a bulky hydrocarbon radical or a soft segment, for example a branched alkyl ester having 4 or more carbon atoms or a cycloalkyl ester having 6 or more atoms, a polyalkylene glycol monoacrylate or monomethacrylate optionally having a terminal alkyl ether group or an adduct of 2-hydroxyethyl acrylate or methacrylate with caprolactone, as described in EP-A-779304.

The hydrolysable film-forming polymer (A) can alternatively be a carboxylic acid-functional polymer, for example a copolymer of acrylic or methacrylic acid with one or more alkyl acrylate or methacrylate, at least some of the acid groups of which have been converted to groups of the formula —COO—M—OH, where M is a divalent metal such as copper, zinc, calcium, magnesium or iron, as described in GB-A-2311070.

The film-forming polymer (A) can alternatively be a salt of an amine, preferably an amine containing at least one aliphatic hydrocarbon group having 8 to 25 carbon atoms and an acid-functional film-forming polymer as described in EP-A-529693. The acid-functional polymer is preferably an addition copolymer of an olefinically unsaturated carboxylic acid, sulphonic acid, acid sulphate ester, phosphonic acid or acid phosphate ester and at least one olefinically unsaturated co-monomer. The unsaturated carboxylic acid can for example be acrylic or methacrylic acid. The unsaturated sulphonic acid can for example be 2-acrylamido-2-methylpropane sulphonic acid (AMPS), for example the film-forming polymer (A) may preferably be an amine sulphonate copolymer containing units of an organocyclic ester as described in our co-pending application GB 9801747.8.

The non-hydrolyzing water-insoluble film-forming polymer (B) can for example be a vinyl ether polymer, for example a poly(vinyl alkyl ether) or a copolymer of a vinyl alkyl ether with vinyl acetate or vinyl chloride, an acrylate ester polymer such as a homopolymer or copolymer of one or more alkyl acrylates or methacrylates which preferably contain 1 to 6 carbon atoms in the alkyl group and may contain a co-monomer such as acrylonitrile or styrene, or a vinyl acetate polymer such as polyvinyl acetate or a vinyl acetate vinyl chloride copolymer. The polymer (B) can alternatively be a polyamine, particularly a polyamide having a plasticising effect such as a polyamide of a fatty acid dimer or the polyamide sold under the Trademark "Santiciser".

We have found that the paints of the invention have the optimum combination of film-forming and eroding properties when the non-hydrolyzing water-insoluble film-forming polymer (B) is present in the composition, albeit as a minor proportion of the auxiliary film-forming resin. Most preferably the weight ratio of rosin to total auxiliary film-forming resin is from 25:75, 50:50 or 55:45 up to 80:20. The hydrolyzing or dissociating film-forming polymer (A) preferably forms at least 30, most preferably at least 50, up to 80 or 90% by weight of the auxiliary film-forming resin, the non-hydrolyzing water-insoluble polymer (B) being the remainder.

The antifouling paint can include a non-polymeric plasticiser. Such a plasticiser can for example be present at up to 50% by weight based on the total binder polymer, most preferably at least 10% and up to 35% by weight based on binder polymer. Examples of such plasticisers are phthalate esters such as dibutyl phthalate, butyl benzyl phthalate or dioctyl phthalate, phosphate triesters such as tricresyl or tris(isopropyl)phenyl phosphate, or chlorinated paraffins.

The rosin and the polymers forming the auxiliary film-forming resin can be mixed in a common solvent which forms at least part of the paint solvent, for example an aromatic hydrocarbon such as xylene, toluene or trimethylbenzene, an alcohol such as n-butanol, an ether alcohol such as butoxyethanol or methoxypropanol, an ester such as butyl acetate or isoamyl acetate, an ether-ester such as ethoxyethyl acetate or methoxypropyl acetate, a ketone such as methyl isobutyl ketone or methyl isoamyl ketone, an aliphatic hydrocarbon such as white spirit, or a mixture of two or more of these solvents. The paint can alternatively be water-based, for example it can be based on a commercial aqueous rosin dispersion.

The binder may be the ingredient having marine biocide properties (for example some long chain amines used to form amine salt copolymers are biocidal) but more usually the binder is mixed with a biocide for aquatic organisms and usually with a pigment using conventional paint-blending techniques. The biocide may itself be all or part of the pigment of the paint. The coating composition preferably has a pigment volume concentration of, for example, 15 to 55%. The pigment preferably comprises at least one sparingly soluble metalliferous pigment having a solubility in seawater of from 0.5 to 10 parts per million by weight. Examples of such pigments which are also aquatic biocides include copper or zinc compounds, such as cuprous oxide, cuprous thiocyanate, cuprous sulphate, zinc ethylene bis (dithiocarbamate), zinc dimethyl dithiocarbamate, zinc pyrithione, copper pyrithione, zinc diethyl dithiocarbamate, copper resinate or cuprous ethylene bis(dithiocarbamate). Other sparingly soluble pigments having a solubility in sea water of 0.5 to 10 parts per million include barium sulphate, calcium sulphate, dolomite and zinc oxide. Mixtures of sparingly soluble pigments can be used, for example cuprous oxide, cuprous thiocyanate or zinc ethylene bis (dithiocarbamate), which are highly effective biocidal pigments, can be mixed with zinc oxide, which is not effective as a biocide but dissolves slightly more rapidly in seawater. Copper metal can be present as an aquatic biocide, for example in flake or powder form.

The antifouling coating composition can contain a non-metalliferous biocide for marine organisms, for example tetramethyl thiuram disulphide, methylene bis(thiocyanate), captan, pyridiniumtriphenylboron, a substituted isothiazolone such as 4,5-dichloro-2-n-octyl-4-isothiazolin-3-one, 2-methylthio-4-t.butylamino-6-cyclopropylamino-s-triazine, N-3,4-dichlorophenyl-N',N'-dimethyl-urea ("Diuron"), 2-(thio-cyanomethylthio) benzothiazole, 2,4,5, 6-tetrachloro-isophthalonitrile, dichlorofluanid, tolylfluanid or 2,3,5,6-tetrachloro-4-(methyl-sulphonyl)pyridine. Such a non-metalliferous biocide can be used as the only biocide of the coating in a copper-free, or even metal-free or pigment-free, antifouling coating. Many of these non-metalliferous biocides are solid and all are sparingly soluble in seawater and may help the "self-polishing" action of the paint.

The coating composition can additionally contain a pigment which is not reactive with seawater and may be highly insoluble in seawater (solubility below 0.5 part per million by weight) such as titanium dioxide or ferric oxide or an organic pigment such as phthalocyanine or azo pigment. Such highly insoluble pigments are preferably used at less than 60% by weight of the total to pigment component of the paint, most preferably less than 40%. The coating composition can additionally contain conventional thickeners, particularly thixotropes such as silica or bentonite and/or stabilisers, for example zeolites or aliphatic or aromatic amines such as dehydroabietylamine.

The invention is illustrated by the following Examples:

EXAMPLES 1 to 14

The following materials were mixed in the stated % by weight in a high speed disperser to form antifouling paints according to the invention.

| Example No.: | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Rosin | 10.01 | 10.01 | 10.09 | 9.68 | 10.06 | 10.00 | 9.94 | 9.93 | 10.01 | 7.81 | 4.27 | 9.83 | 11.08 | 3.88 |
| Hydrolysable acrylic Polymer (A1) | 4.89 | — | — | 6.66 | 5.54 | — | 5.47 | 5.46 | 5.51 | 9.42 | 12.07 | — | — | — |
| Hydrolysable acrylic Polymer (A2) | — | 5.37 | 5.56 | — | — | — | — | — | — | — | — | 6.09 | 6.86 | 11.98 |
| Hydrolysable acrylic Polymer (A3) | — | — | — | — | — | 4.37 | — | — | — | — | — | — | — | — |
| Non-hydrolyzing acrylic polymer (B1) | 1.72 | 1.30 | — | — | — | — | 1.18 | 1.18 | 1.19 | 2.03 | 2.50 | 0.58 | 0.65 | 1.14 |
| Non-hydrolyzing acrylic polymer (B2) | — | — | 1.11 | — | 1.11 | 1.10 | — | — | — | — | — | — | — | — |
| Tris(isopropylphenyl)phosphate plasticiser | 5.11 | 5.11 | 5.15 | 4.95 | 5.14 | 5.11 | 5.08 | 5.07 | 5.11 | 2.13 | 2.03 | — | — | 4.08 |
| Red copper oxide | 37.58 | 37.55 | 37.87 | 36.34 | 37.83 | 37.59 | 37.38 | 37.33 | 37.65 | 36.04 | 34.24 | — | — | — |
| Purple copper oxide | — | — | — | — | — | — | — | — | — | — | — | 38.70 | 39.56 | 36.06 |
| Zinc Oxide | 11.92 | 11.91 | 12.01 | 11.52 | 11.96 | 11.88 | 11.81 | 11.80 | 11.92 | 11.39 | 10.82 | 12.25 | 12.52 | 11.41 |
| Zinc ethylene bis(dithiocarbamate) | 2.88 | 2.88 | — | — | — | 4.10 | — | 4.08 | — | 1.97 | — | — | — | — |
| Zinc pyrithione | — | — | 1.94 | 1.86 | — | — | — | — | — | — | — | — | — | — |
| Copper pyrithione | — | — | — | — | — | — | 3.95 | — | — | — | 3.62 | — | — | — |
| Organic biocide (C1) | 0.76 | 0.76 | 1.28 | 1.23 | — | — | — | — | — | — | — | — | — | — |
| Organic biocide (C2) | — | — | — | — | 2.39 | — | — | — | — | — | — | — | — | — |
| Dichlorofluanid | — | — | — | — | — | — | — | — | 3.46 | 1.66 | — | 2.95 | 3.02 | 2.75 |
| Synthetic iron oxide | 2.81 | 2.81 | 2.59 | 6.18 | 4.10 | 4.07 | — | — | — | — | — | — | — | — |
| Natural iron oxide | — | — | — | — | — | — | 3.56 | 3.56 | 3.59 | 3.43 | 3.71 | — | — | — |
| Carbon black | — | — | — | — | — | — | — | — | — | — | — | 0.99 | 1.02 | 0.93 |
| Solvent | 19.61 | 19.61 | 19.69 | 20.59 | 19.66 | 19.57 | 19.43 | 19.4 | 19.34 | 22.00 | 24.72 | 18.71 | 19.5 | 25.74 |
| Additives | 2.70 | 2.70 | 2.60 | 0.98 | 2.23 | 2.22 | 2.20 | 2.20 | 2.22 | 2.12 | 2.02 | 2.18 | 2.23 | 2.03 |

Acrylic polymer A1 is an acrylic acid copolymer substantially according to Production Example 1 of EP-A-779304 in which the acrylic acid units are blocked by copper atoms bound to naphthenic acid residues.

Acrylic polymer A2 is similar to A1 but is based on an acrylic acid copolymer having a higher content of methoxypolyethylene glycol methacrylate.

Acrylic polymer A3 is a copolymer of the methyl bis (hydrogenated tallow) amine salt of 2-acrylamido-2-methylpropanesulphonic acid, isobornyl methacrylate and isobornyl acrylate in mole ratio 27.5:47.5:25.

Acrylic polymer B1 is an alkyl acrylate ester polymer sold under the Trademark "Paraloid B66". Acrylic polymer B2 is a n-butyl acrylate polymer sold under the Trademark "Acronal 4F". Organic biocide C1 is 4,5-dichloro-2-n-octyl-4-isothiazoline-3-one. Organic biocide C2 is sold under the Trademark "Irgarol 1051".

The solvent comprised mainly xylene with minor amounts of methyl isoamyl ketone, methyl isobutyl ketone and n-butanol. The rosin and acrylic polymers were dissolved in solvent before being mixed with the other paint ingredients.

Additives comprised an organo-clay structuring agent, silica, carbon black and molecular sieve zeolite.

As a test of antifouling performance the paints of Examples 1–14 were each applied to plywood boards which had been pre-painted with a commercial anti-corrosive primer and the boards were immersed in the sea at Newton Ferrers, Devon, England, Burnham-on-Crouch, Essex, England and Singapore. As a comparative test, primed boards were coated with a rosin paint having a formulation similar to Example 1 but containing extra "Paraloid B66" in place of the hydrolysable acrylic polymer. These boards were immersed at the same time and at the same sites as comparisons to both Examples 1 and 2; the paints of Examples 3 to 14 were immersed similarly but not in a comparative experiment. The paint films were periodically assessed for settlement of marine fouling organisms and the results are shown below.

In all results quoted below, 100=Totally clean, 0=Totally fouled.

| Example | Average fouling rating | number of sites |
|---|---|---|
| 1 | 76.4 | 6 |
| Comparative 1 | 70.6 | 6 |
| 2 | 71.3 | 3 |
| Comparative 2 | 59.0 | 3 |
| 3 | 84.2 | 3 |
| 4 | 83.3 | 3 |
| 5 | 87.0 | 2 |
| 6 | 76.3 | 6 |
| 7 | 86.5 | 4 |
| 8 | 88.0 | 4 |
| 9 | 88.0 | 4 |
| 10 | — | — |
| 11 | — | — |
| 12 | 84.3 | 3 |
| 13 | 84.0 | 1 |
| 14 | 89.3 | 3 |

What is claimed is:

1. An antifouling paint having a binder comprising a rosin material and an auxiliary film-forming resin, the paint including an ingredient having marine biocide properties, wherein the binder comprises a blend of the rosin material and an auxiliary film-forming resin in a ratio of 20:80 to 95:5 by weight, the auxiliary film-forming resin comprising 20–100% by weight of an acid-functional film-forming polymer (A) whose acid groups are blocked by groups capable of hydrolyzing or dissociating to leave a polymer soluble in sea water, the blocking groups being selected from divalent metal atoms bonded to a monovalent organic residue, divalent metal atoms bonded to a hydroxyl residue and monoamine groups which form an organic solvent soluble amine salt of the polymer, and 80–0% by weight of a non-hydrolyzing water-insoluble film-forming polymer (B).

2. An antifouling paint according to claim 1 wherein the rosin material is rosin.

3. An antifouling paint according to claim 1 wherein the binder comprises a blend of the rosin material and the auxiliary film-forming resin in a ratio of 55:45 to 80:20 by weight.

4. An antifouling paint according to claim 1 wherein the auxiliary film-forming resin comprises 30–90% by weight of the film-forming polymer (A) capable of hydrolyzing or dissociating to a polymer soluble in sea water and 70–10% by weight of the non-hydrolyzing water-insoluble film-forming polymer (B).

5. An antifouling paint according to claim 1 wherein the film-forming polymer (A) is a hydrolysable polymer having at least one side chain bearing at least one terminal group of the formula:

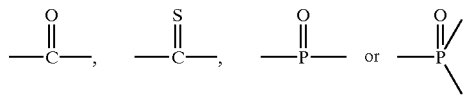

wherein X represents

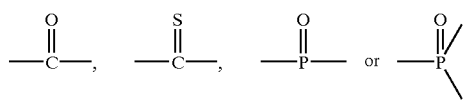

M is a metal selected from zinc, copper and tellurium; x is an integer of 1 to 2;

R represents an organic residue selected from

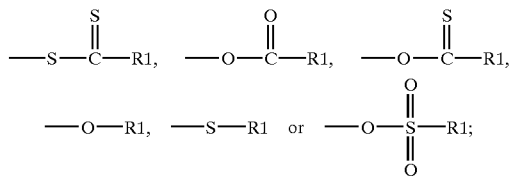

and R1 is a monovalent organic residue.

6. An antifouling paint according to claim 5 wherein the hydrolysable polymer is an acrylic polymer in which X represents

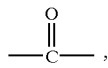

M is copper and R represents

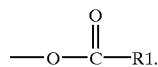

7. An antifouling paint according to claim 1 wherein the film-forming polymer (A) is a carboxylic acid-functional polymer, at least some of the acid groups of which have been converted to groups of the formula —COO—M—OH, where M is a divalent metal.

8. An antifouling paint according to claim 1 wherein the film-forming polymer (A) is a salt of an amine and an addition copolymer of an olefinically unsaturated sulphonic acid or acid sulphate ester and at least one olefinically unsaturated co-monomer.

9. An antifouling paint according to claim 1 wherein the film-forming polymer (A) is a salt of an amine and an addition copolymer of an olefinically unsaturated carboxylic acid and at least one olefinically unsaturated co-monomer.

10. An antifouling paint according to claim 7 wherein the amine contains at least one aliphatic hydrocarbon group having 8 to 25 carbon atoms.

11. An antifouling paint according to claim 1 wherein the non-hydrolyzing water-insoluble film-forming polymer (B) is an acrylate ester polymer or a vinyl ether polymer.

12. An antifouling paint according to claim 1 wherein the binder includes a non-polymeric plasticiser present at up to 50% by weight based on the total binder polymer.

13. An antifouling paint according to claim 8 wherein the amine contains at least one aliphatic hydrocarbon group having 8 to 25 carbon atoms.

14. An antifouling paint according to claim 2 wherein the binder comprises a blend of the rosin material and the auxiliary film-forming resin in a ration of 55:45 to 80:20 by weight.

15. An antifouling paint according to claim 2 wherein the non-hydrolyzing water-insoluble film-forming polymer (B) is an acrylate ester polymer or a vinyl ether polymer.

16. An antifouling paint according to claim 3 wherein the non-hydrolyzing water-insoluble film-forming polymer (B) is an acrylate ester polymer or a vinyl ether polymer.

17. An antifouling paint according to claim 4 wherein the non-hydrolyzing water-insoluble film-forming polymer (B) is an acrylate ester polymer or a vinyl ether polymer.

18. An antifouling paint according to claim 5 wherein the non-hydrolyzing water-insoluble film-forming polymer (B) is an acrylate ester polymer or a vinyl ether polymer.

19. An antifouling paint according to claim 6 wherein the non-hydrolyzing water-insoluble film-forming polymer (B) is an acrylate ester polymer or a vinyl ether polymer.

20. An antifouling paint according to claim 7 wherein the non-hydrolyzing water-insoluble film-forming polymer (B) is an acrylate ester polymer or a vinyl ether polymer.

21. An antifouling paint according to claim 8 wherein the non-hydrolyzing water-insoluble film-forming polymer (B) is an acrylate ester polymer or a vinyl ether polymer.

22. An antifouling paint according to claim 9 wherein the non-hydrolyzing water-insoluble film-forming polymer (B) is an acrylate ester polymer or a vinyl ether polymer.

23. An antifouling paint according to claim 13 wherein the non-hydrolyzing water-insoluble film-forming polymer (B) is an acrylate ester polymer or a vinyl ether polymer.

24. An antifouling paint according to claim 14 wherein the non-hydrolyzing water-insoluble film-forming polymer (B) is an acrylate ester polymer or a vinyl ether polymer.

* * * * *

UNITED STATES PATENT AND TRADEMARK OFFICE
CERTIFICATE OF CORRECTION

PATENT NO. : 6,559,202 B1
DATED : May 6, 2003
INVENTOR(S) : Fox et al.

It is certified that error appears in the above-identified patent and that said Letters Patent is hereby corrected as shown below:

Column 7,
Lines 11-40, claim 5 should read:

5. An antifouling paint according to claim 1 wherein the film-forming polymer (A) is a hydrolysable polymer having at least one side chain bearing at least one terminal group of the formula:

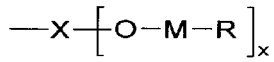

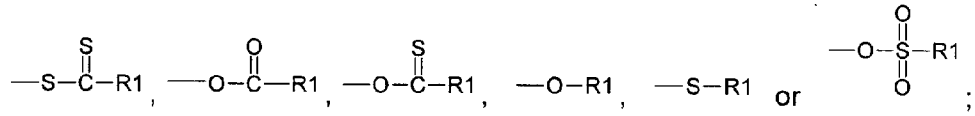

M is a metal selected from zinc, copper and tellurium; x is an integer of 1 to 2; R represents an organic residue selected from

and R1 is a monovalent organic residue.

Signed and Sealed this

Twenty-third Day of September, 2003

JAMES E. ROGAN
*Director of the United States Patent and Trademark Office*